United States Patent [19]

Nakajima et al.

[11] Patent Number: 5,016,112
[45] Date of Patent: May 14, 1991

[54] COMBINED VIDEO RECORDER AND CAMERA WITH SUPERIMPOSITION OF VIDEO AND DATA

[75] Inventors: Takatsugu Nakajima, Tokyo; Katsumi Endo; Toru Miura, both of Kanagawa, all of Japan

[73] Assignee: Sony Corporation, Tokyo, Japan

[21] Appl. No.: 396,527

[22] Filed: Aug. 21, 1989

[30] Foreign Application Priority Data

Aug. 23, 1988 [JP] Japan .................................. 63-209092

[51] Int. Cl.$^5$ ............................................. H04N 5/76
[52] U.S. Cl. ................................... 358/335; 358/185; 358/906
[58] Field of Search ............... 358/185, 335, 906, 909, 358/22, 310, 210; 360/33.1

[56] References Cited

U.S. PATENT DOCUMENTS 4,555,803 11/1985 Hirose ............................ 358/335 X
4,858,012 8/1989 Hino et al. ...................... 358/906 X

FOREIGN PATENT DOCUMENTS

0326327A2 8/1989 European Pat. Off. .
0356336A2 2/1990 European Pat. Off. .

Primary Examiner—Robert L. Richardson
Attorney, Agent, or Firm—Philip M. Shaw, Jr.

[57] ABSTRACT

A video recording apparatus having a built-in type camera which includes an imager for picking up an object and a recorder for recording a video signal derived from the imager in accordance with a predetermined format having an analog-to-digital converter for converting the video signal from the image to digital image data, a memory for storing the digital image data, a converting circuit for converting the image data read out from the memory to an image signal, a superimposing circuit for superimposing the image signal formed of the image data upon the video signal from the imager, a control circuit for controlling the writing and reading of the image data in the memory, a first operation switch for causing the control circuit to store the image data in the memory, a second operation switch for causing the control circuit to superimpose the image signal upon the video signal, and a third operation switch causing the control circuit to designate the color of the image signal, wherein when the second operation switch is in its OFF-state, the third operation switch is operated as a selection switch of other camera mode functions.

5 Claims, 6 Drawing Sheets

Normal Mode → Reverse Mode

BATTERY →

TAPE END →

OUTDOOR →

INDOOR →

COMBINED VIDEO RECORDER AND CAMERA WITH SUPERIMPOSITION OF VIDEO AND DATA

BACKGROUND OF THE INVENTION

1. Field of the Invention

The present invention relates generally to video tape recorders and, more particularly, is directed to a video tape recorder having a built-in camera which comprises an image pickup portion for picking up an image of an object and a recording portion for recording a video signal derived from the image pickup portion, and which is suitable for application to a so-called 8 mm video tape recorder having a built-in type camera.

2. Description of the Prior Art

A prior-art 8 mm video tape recorder having a built-in type camera comprises an image pickup portion for picking up an image of an object and a recording portion for recording a video signal derived from the image pickup portion on a magnetic tape. Such an 8 mm video tape recorder is also provided with a character generator for generating, for example, a title information or the like and has a superimposing function for superimposing an image signal upon the video signal derived from the image pickup portion and a so-called titler function. According to the combination of the superimposing function and the titler function, the image signal of the title information is superimposed upon the video signal derived from the image pickup portion.

Further, a so-called titler apparatus, a Telopper apparatus and the like are provided as peripheral apparatus in order to record the video signal having inserted thereinto the title information corresponding to the recorded content and the image signal of Telop information such as a commentary for a picture and the like by a video tape recorder. Upon use, the titler apparatus, Telopper apparatus and the like are generally combined with the floor-type video tape recorder and are used to edit the recorded tape or the like.

The prior-art video tape recorder having a built-in type camera utilizes three kinds of operation switches to superimpose the image signal of the title information corresponding to the recorded content upon the video signal. The first operation switch is used to store the image signal of the title information in a memory. The second operation switch is used to superimpose the image signal of the title information stored in the memory upon the video signal. The third operation switch is used to selectively switch the color of the image signal of the title information to be superimposed upon the video signal.

In the case of the prior-art video tape recorder having a built-in type camera with three kinds of operation switches associated with the title information, if it is intended to increase a new function in association with the title information, then it becomes necessary to independently provide a special operation switch, which provides a complicated arrangement, an increased cost and a degraded operating characteristic.

OBJECTS AND SUMMARY OF THE INVENTION

Accordingly, it is an object of the present invention to provide an improved video recording apparatus having a built-in type camera which can remove the defects encountered with the prior art.

More specifically, it is another object of the present invention to provide a video recording apparatus having a built-in camera which can be simplified in arrangement.

It is still another object of the present invention to provide a video recording apparatus having a built-in type camera which can reduce the manufacturing cost.

It is still another object of the present invention to provide a video recording apparatus having a built-in type camera, by which good operating characteristics can be gained in use.

It is still another object of the present invention to provide a video recording apparatus having a built-in type camera which is suitable for application to a so-called 8 mm video tape recorder having a built-in camera.

According to an aspect of the present invention, there is provided a video recording apparatus of the type having a built-in type camera which includes an image pickup portion for picking an object and a recording portion for recording a video signal derived from the image pickup portion in accordance with a predetermined format, wherein the improved apparatus comprises:

(a) means for converting the video signal from the image pickup portion to digital image data;

(b) memory means for storing the digital image data;

(c) means for producing an image signal from the image data read out from the memory means, said image signal having a plurality of modes;

(d) means for superimposing the image signal formed of the image data upon the video signal from the image pickup portion;

(e) control means for controlling the writing and reading of the image data in the memory means;

(f) first operation switch means for triggering the control means to store the image data in the memory means;

(g) second operation switch means for triggering the control means to superimpose the image signal upon the video signal; and (h) third operation switch means for triggering the control means to designate a color for the image signal, wherein when the second operation switch means has not been engaged, the third operation switch means is operated as a mode selection switch for selecting one of the modes of the image signal.

The above, and other objects, features and advantages of the present invention will become apparent from the following detailed description of a preferred embodiment of the invention when read in conjunction with the accompanying drawings in which the same reference numerals identify corresponding parts in the several views.

BRIEF DESCRIPTION OF THE DRAWINGS

The accompanying drawings show a preferred embodiment of the present invention in which.

DETAILED DESCRIPTION OF A PREFERRED EMBODIMENT

A so-called 8 mm video tape recorder of a built-in camera type to which the present invention is applicable will be described hereinafter with reference to the attached drawings.

Figure 1:
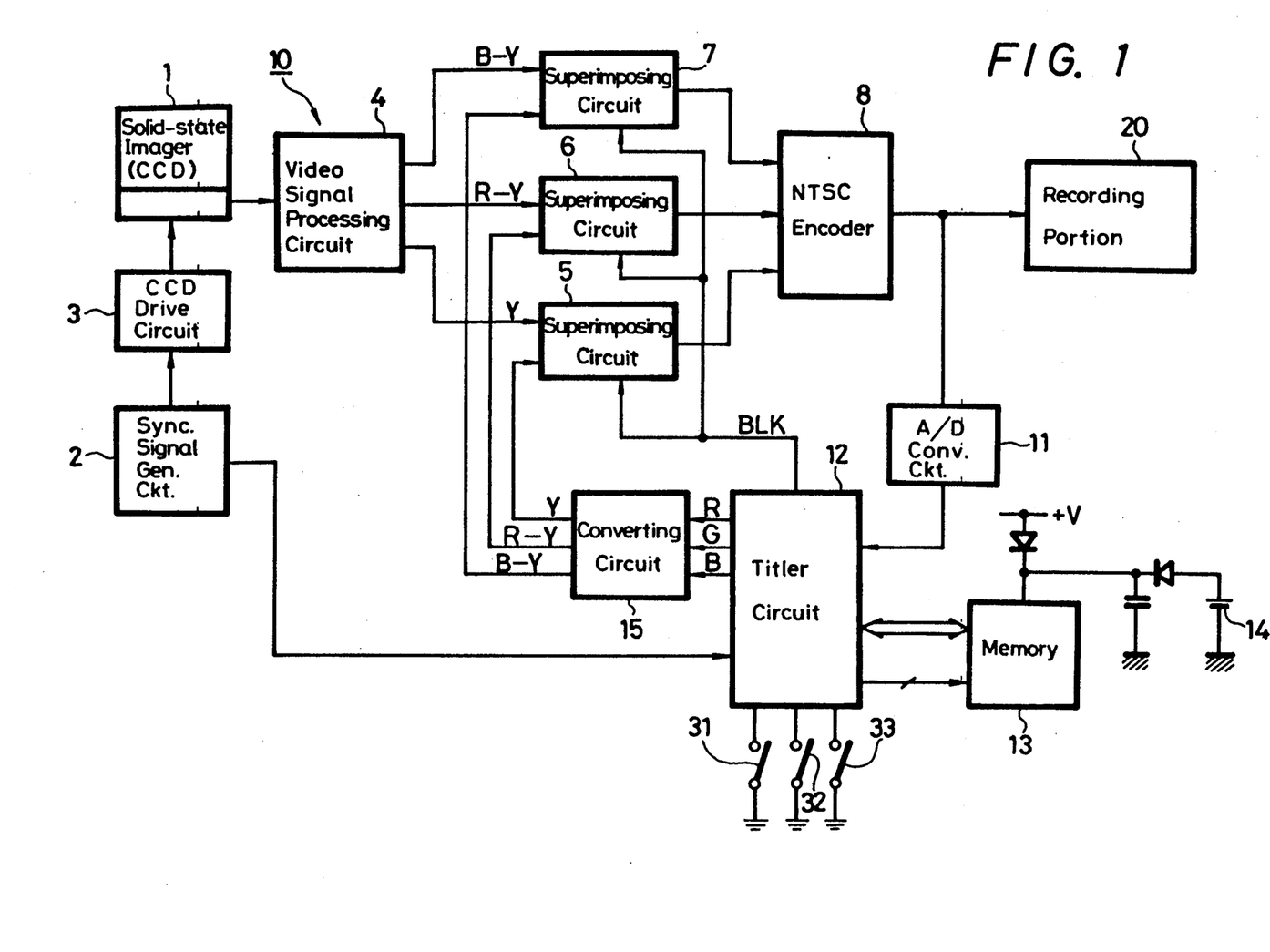
FIG. 1 is a block diagram showing a video recording apparatus with a camera according to an embodiment of the present invention.

Referring to the drawings in detail, and initially to the block diagram forming FIG. 1, it will be seen that an image pickup portion 10 picks up an object 100 (FIG. 2) and the video signal from the image pickup portion 10 is recorded in accordance with a predetermined 8 mm video format by a recording portion 20.

The image pickup portion 10 is provided with a solid state imager 1 and the solid state imager 1 can be formed of a charge coupled device (CCD). A synchronizing (SYNC) signal generating circuit 2 generates a synchronizing signal and a CCD drive circuit 3 is driven on the basis of the synchronizing signal from the generating circuit 2. The solid state imager 1 is driven by the CCD drive circuit 3, and a video output of the object derived from the solid state imager 1 is supplied to a video signal processing circuit 4.

The video signal processing circuit 4 processes the video signal derived from the solid state imager 1 to provide a luminance signal Y and difference chrominance signals R-Y and B-Y of the object. The luminance signal Y and the difference chrominance signals R-Y and B-Y derived from the video signal processing circuit 4 are respectively supplied through superimposing circuits 5, 6 and 7 to an NTSC encoder 8.

The NTSC encoder 8 encodes the luminance signal Y and the difference chrominance signals R-Y and B-Y to provide a video signal according to the NTSC system. This video signal displays the object image. The video signal formed by the NTSC encoder 8 is supplied to a one-bit analog-to-digital (A/D) converting circuit 11 and to the recording portion 20 which records the video signal in accordance with the predetermined 8 mm video format.

The one-bit, analog-to-digital converting circuit 11 is formed of a level comparator which compares the video signal from the NTSC encoder 8 with a predetermined signal level, and converts the video signal to binary decimal data to form image data. This image data displays one picture in the form of, for example, 64 kilo bytes (8 bits × 8 kilo words). The image data from the A/D converting circuit 11 is supplied through a circuit 12 to a memory 13 and is written therein. The circuit 12 is what might be called a titler circuit, and which will be described more fully later.

The memory 13 can be formed of a static random access memory (static RAM) whose storage capacity corresponds to four sets of image data which is, for example, 64 kilo bytes (8 bits × 8 kilo words). The data write and read of the memory 13 is controlled by the titler circuit 12. The memory 13 is connected to a lithium battery 14 provided as a back-up power source so as to inhibit the data stored therein from being erased when the supply of power from a main power source thereto is interrupted. In this case, a voltage drop detecting circuit (not shown) watches the voltage drop of the lithium battery 14 so that before the back-up function of the battery 14 for the memory 13 is lost, an alarm display is made within an electronic viewfinder 40 (see FIG. 2). The electronic viewfinder 40 is adapted to monitor an object picked up by the image pickup portion 10.

The titler circuit 12 is supplied with the synchronizing signal from the synchronizing signal generating circuit 2. In response to the synchronizing signal, the titler circuit 12 generates write and read address data for the memory 13 to control the writing and reading of the image data in the memory 13. Simultaneously, the titler circuit 12 controls the superimposing circuits 5, 6 and 7 in response to the image data read out from the memory 13, and supplies three primary color signals R, G and B forming a title picture through a converting circuit 15 to the respective superimposing circuits 5, 6 and 7.

Figure 2:
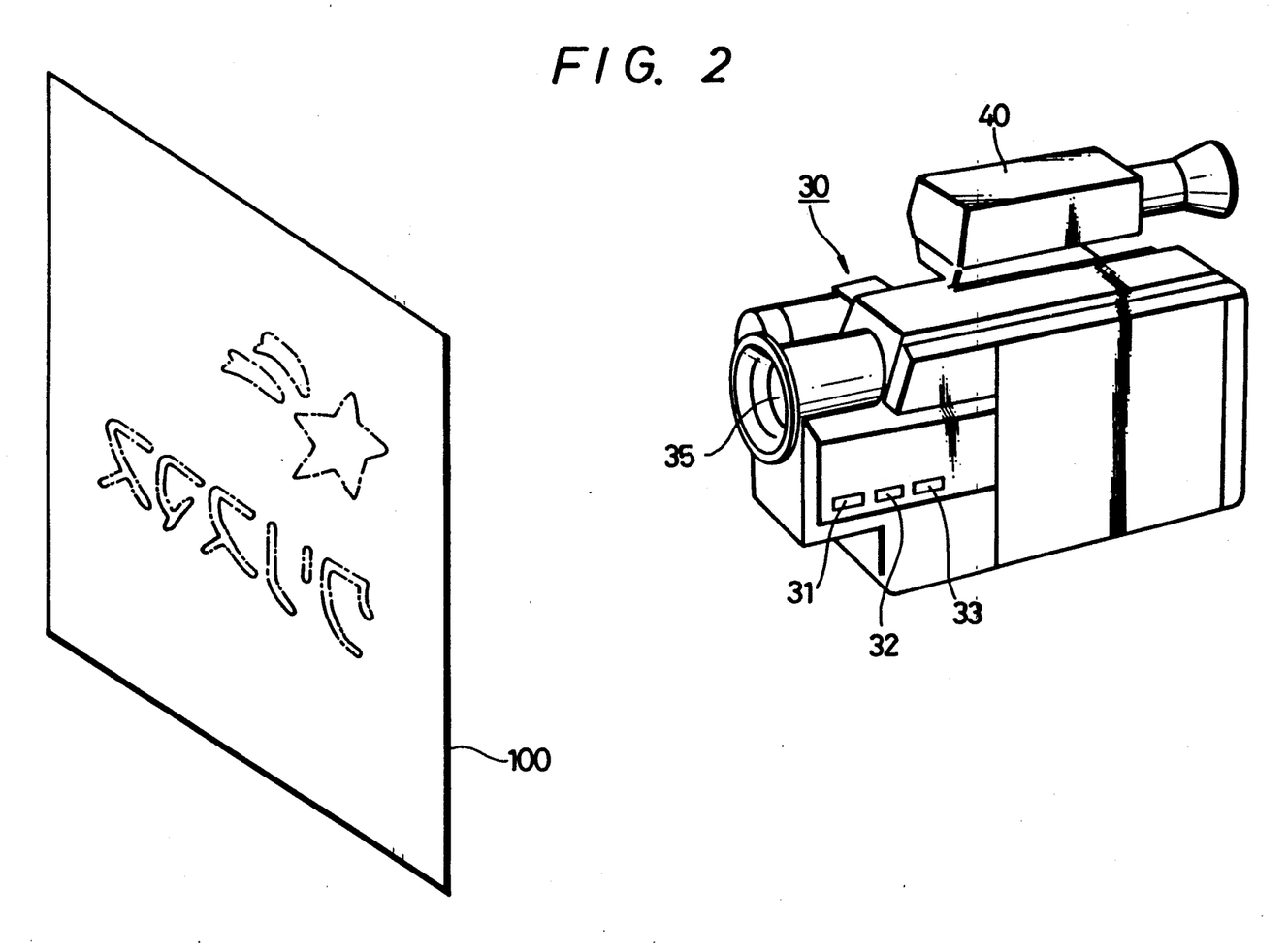
FIG. 2 is a pictorial, perspective view of a video tape recorder having a built-in type camera according to the present invention and an object to be viewed.

The titler circuit 12 is connected with three operation switches 31, 32 and 33 which are provided in an apparatus body 30 having an image pickup lens 35 as shown in FIG. 2. The image pickup lens 35 introduces the light of the picked-up object to the solid state imager 1 of the image pickup portion 10.

The operation mode of the titler circuit 12 is defined by operating the three operation switches 31, 32 and 33 as follows.

Referring back to FIG. 1, the first operation switch 31 designates a registration mode of a title picture. When controlled by the first operation switch 31, then the titler circuit 12 writes the image data from the analog-to-digital converting circuit 11 in the memory 13. When the title picture registration mode is designated by the first operation switch 31 while a desired title picture drawn on a panel 100 (see FIG. 2) is picked up by the image pickup portion 10, then the image data of the title picture picked up by the image pickup portion 10 is written in the memory 13. The memory 13 might store four sets of image data of desired title pictures.

The second operation switch 32 designates the title picture insertion mode. When driven by the second operation switch 32 (ON-state), the titler circuit 12 reads image data of one picture from the memory 13, and controls the superimposing circuits 5, 6 and 7 by using this image data as the control signal. Simultaneously, the titler circuit 12 is also adapted to supply three primary color signals R, G and B corresponding to the image data to the converting circuit 15. The converting circuit 15 converts the three primary color signals R, G and B to the luminance signal Y and the difference chrominance signals R-Y and B-Y and supplies them to the superimposing circuits 5, 6 and 7, respectively.

The third operation switch 33 selects the mode as well designating the color of the title picture. When driven by the second operation switch 32 (ON-state) the titler circuit 12 designates the combination of the three primary color signals R, G and B which are to be outputted in the title picture insertion mode. More specifically, when the second operation switch 32 is in its ON-state, the third operation switch 33 is operated as a color designation switch. When the third operation switch 33 is operated as the color designation switch, the titler circuit 12 can cyclically designate eight kinds of colors. The designated color is displayed within the electronic viewfinder 40 in the form of a character and the like. The color of the title picture can be freely designated by the third operation switch 33 even under the condition that the title picture insertion mode is designated by operating the second operation switch 32. Thus, the color of the title picture can be selectively changed while the video signal with the picture signal of title picture inserted is being recorded by the recording portion 20.

On the other hand, the third operation switch 33 serves as a mode selection switch for the title picture when the second operation switch 32 is in its OFF-state. In this mode the third operation switch 33 is operational to allow selection of either the normal title picture mode according to the prior art, as to the mode of the title picture, a scroll mode for freely moving a displayed title picture on the display screen, a reverse mode for reversing a picture of normal mode, or a reverse/scroll mode for executing the reversing and scrolling at the same time as new functions.

Figure 3:
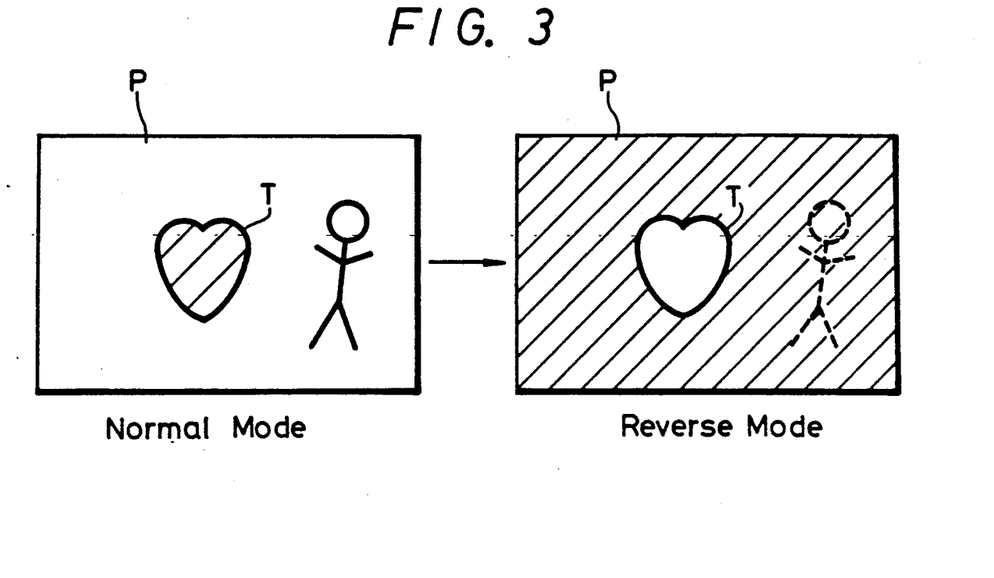
FIG. 3 is a schematic representation to which reference will be made in explaining the reverse mode of the present invention.

FIG. 3 shows the relationship between the normal mode and the reverse mode. As shown in the left-hand side of FIG. 3, in the normal mode, for example, a heart-shaped title picture T is displayed all in red (cross-hatched) and another portion is represented as a normal picture portion P. In the reverse mode, as shown in the right-hand side portion of FIG. 3, the normal picture portion P is all in red (cross-hatched) and the portion of the heart-shaped title picture portion T is made blank, thus providing a normal picture at that portion. In the scroll mode, only the heart-shaped title picture portion T is moved.

Figure 4:
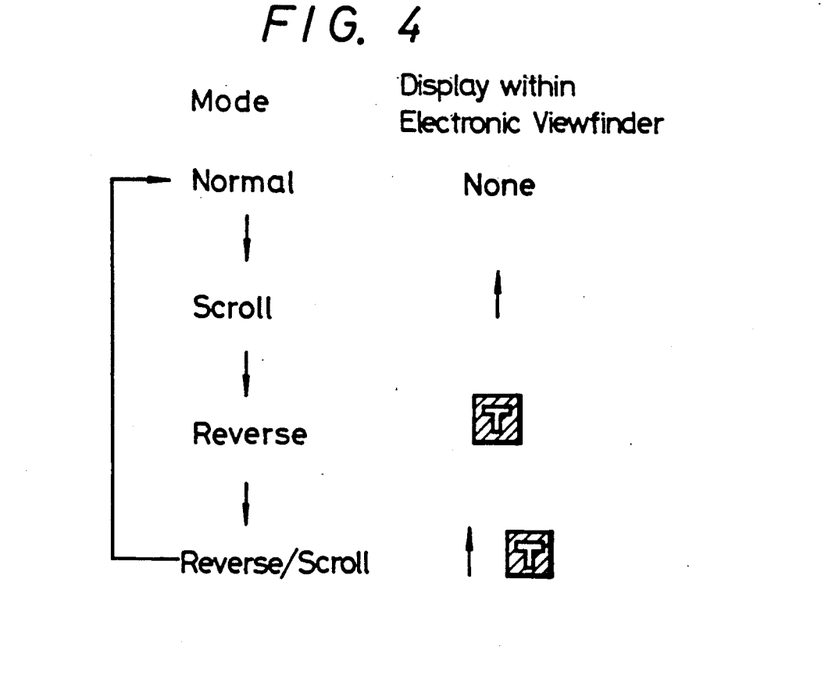
FIG. 4 is a schematic representation to which reference will be made in explaining the mode switching operation of the present invention.

When the third operation switch 33 is used as the mode selection switch, i.e. the switch 32 is in the OFF state, the normal mode, the scroll mode, the reverse mode, the reverse/scroll mode and the normal mode are cyclically presented in this order, as shown in the left-hand side of in FIG. 4. The display appearing within the electronic viewfinder 40 upon the selection of each mode is shown in the right-hand side of FIG. 4.

The operation of the above-mentioned titler circuit 12 will be described with reference to flow charts forming FIGS. 5 and 6. Though not shown, the titler circuit 12 incorporates therein a microcomputer, and the decision operations, which will be described later, are executed by this microcomputer. A timer for recording mode information or the like is also stored in a memory of this microcomputer.

Figure 5:
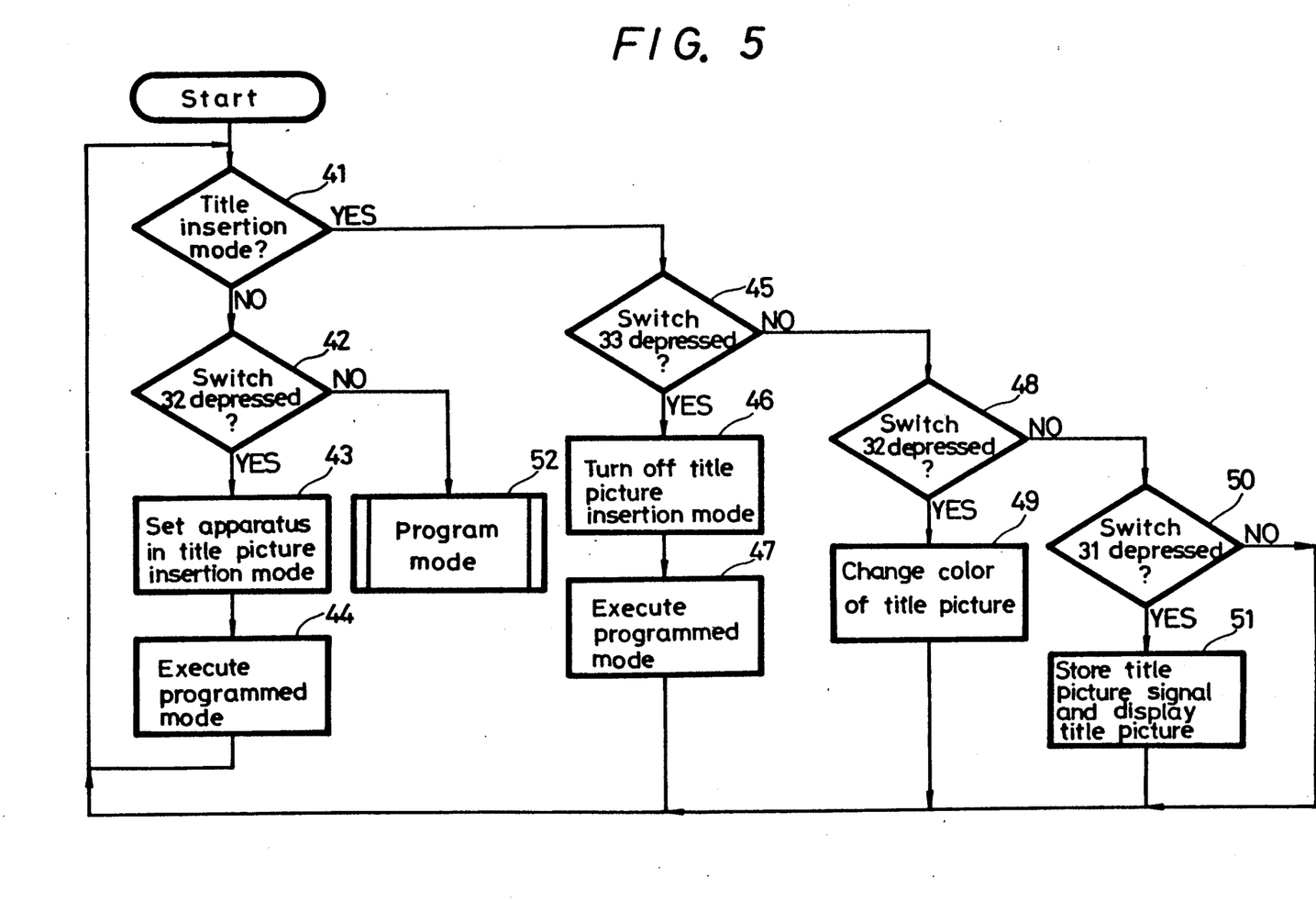
FIGS. 5 and 6 are flow charts to which reference will be made in explaining the operation of the present invention.

Turning then to FIG. 5, following the Start of the operation, it is initially determined at decision step 41 whether or not the apparatus is in the title insertion mode wherein the image signal of the title picture is inserted into the video signal. If it is not the title insertion mode as represented by a NO at step 41, the routine proceeds to the next decision step 42. It is then determined at step 42 whether the second operation switch 32 is pressed or not. If the second operation switch 32 is pressed down as represented by a YES at step 42, the apparatus is changed to the title insertion mode to insert the image signal of the title picture into the video signal at step 43. Then, the routine proceeds to step 44.

In step 44, the timer recording mode, programmed by the timer recording mode sub-routine at step 52, which will be described later, is executed. For example, if the timer recording mode is the normal mode, then the title picture appears on the display screen. If the timer recording mode is the scroll mode, then the title picture appears from, for example, the lower side of the picture screen and stops at a predetermined position. If it is the reverse mode, the displayed picture is reversed. After the completion of each of these executions, the routine returns to step 41.

If it is determined that the apparatus is in the title insertion mode as represented by a YES at step 41, the routine proceeds to the next decision step 45. In step 45, it is determined whether or not the second operation switch 32 is pressed. If the second operation switch 32 is pressed as represented by a YES at step 45, then the title picture insertion mode is turned off at step 46. The routine proceeds to step 47, whereat the timer recording mode is executed. More specifically, if the timer recording mode is the normal mode or the reverse mode, then the title picture disappears from the picture screen. If the timer recording mode is the scroll mode, then the title picture moves upwards from the predetermined stop position thereof and then disappears. If the step 47 is executed, then the routine returns to step 41.

If the second operation switch 32 is not pressed as represented by a NO at decision step 45, then the routine proceeds to the next decision step 48. In decision step 48, it is determined whether the third operation switch 33 is pressed or not. If the third operation switch 33 is pressed, as represented by a YES at step 48, then the routine proceeds to step 49, whereat the color of the title picture is switched to a desired color. The color of the title picture can be cyclically switched to eight kinds of colors by operating the third operation switch 33. At the end of switching the color of the title picture, the routine returns to step 41.

If the third operation switch 33 is not pressed, as represented by a NO at step 48, the routine proceeds to the next decision step 50. In step 50, it is determined whether the first operation switch 31 is pressed or not. If the first operation switch 31 is pressed, as represented by a YES at step 50, then the routine proceeds to step 51, whereat the picture signal of title picture is stored in the memory 13 and the title picture is displayed on the picture screen. At the completion of the step 51, the routine returns to step 41. If the first operation switch 31 is not pressed, then the routine returns to step 41.

If the second operation switch 32 is not pressed, as represented by a NO at step 42, then the routine proceeds to step 52, wherein the sub-routine for programmed timer-activated recording mode is presented.

The sub-routine for programming various operation modes will be described with reference to a flow chart forming FIG. 6.

Figure 6:
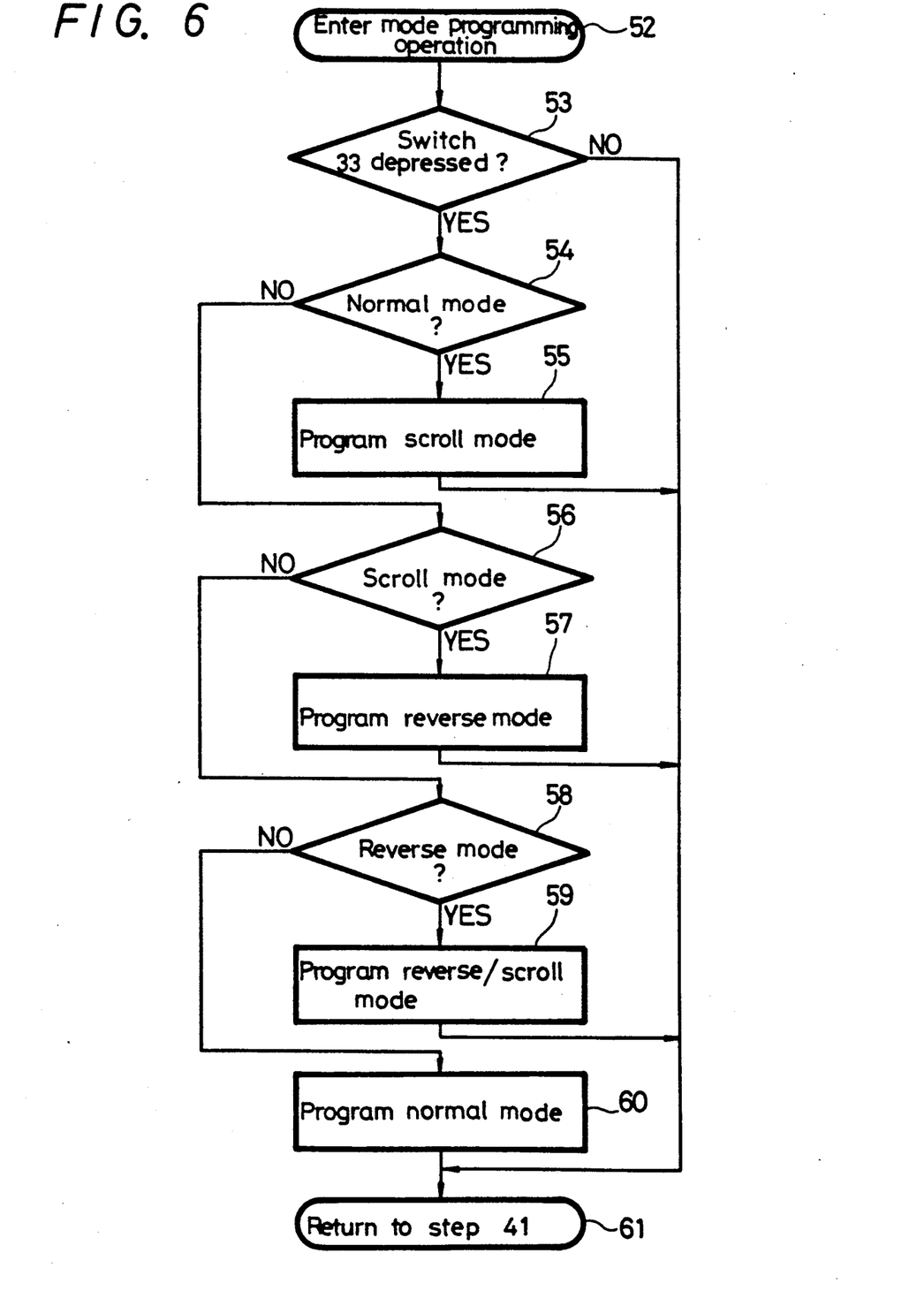

Referring to FIG. 6, the routine enters a mode programming routine at step 52. Then, the routine proceeds to the next decision step 53, whereat it is determined whether or not the third operation switch 33 is depressed. If it is determined that the third operation switch 33 is not depressed, as represented by a NO at step 53, the mode programmed is not altered and the routine proceeds to step 61, from which the routine returns to step 41 of the main routine of FIG. 5.

If on the other hand it is determined that the third operation switch 33 is depressed, as represented by a YES at step 53, then the routine proceeds to the next decision step 54. It is determined at decision step 54 whether or not the previous mode is the normal mode. If it is determined that the previous mode is the normal mode, as represented by a YES at step 54, the routine proceeds to step 55, whereat the scroll mode is programmed. Then, the routine proceeds to step 61.

If it is determined that the previous mode is not the normal mode, as represented by a NO at step 54, then the routine proceeds to decision step 56. It is determined at decision step 56 whether or not the previous mode is the scroll mode. If it is determined that the previous mode is the scroll mode, as represented by a YES at step 56, the routine proceeds to step 57, in which the reverse mode is programmed, and then the routine proceeds to step 61. If it is determined that the previous mode is not the scroll mode, as represented by a NO at step 56, then the routine proceeds to decision step 58. It is determined at step 58 whether or not the previous mode is the reverse mode. If it is determined that the previous mode is the reverse mode, as represented by a YES at step 58, then the routine proceeds to step 59. In step 59, the reverse/scroll mode is programmed, and the routine proceeds to step 61.

If it is determined that the previous mode is not the reverse mode, as represented by a NO at step 58, then the routine proceeds to step 60, whereat the normal mode is programmed and the routine proceeds to step 61.

The sub-routine for programming various modes ends with step 61, and the routine returns to step 41 of the main routine of FIG. 5. Each time the operation mode is programmed, the marks shown in the right-hand side of FIG. 4 are displayed on the picture screen of the electronic viewfinder 40 accordingly.

As described above, if the second operation switch 32 is not pressed when the title picture insertion mode is turned OFF, then the third operation switch 33 is changed in its function to the mode selection switch from its inherent color designation switch. If the third operation switch 33 is pressed under such conditions, then it becomes possible to program a desired timer-activated mode.

Only one mode is programmed in the memory of the microcomputer of the titler circuit 12 each time the third operation switch 33 is pressed. If the second operation switch 32 is pressed under the desired mode programmed, then the programmed, desired mode is executed. In other words, if the second operation switch 32 is pressed under the condition that, for example, the timer-activated scroll mode is programmed by pressing the third operation switch 33, then the scroll operation is executed so as to move the title picture.

Figure 7:
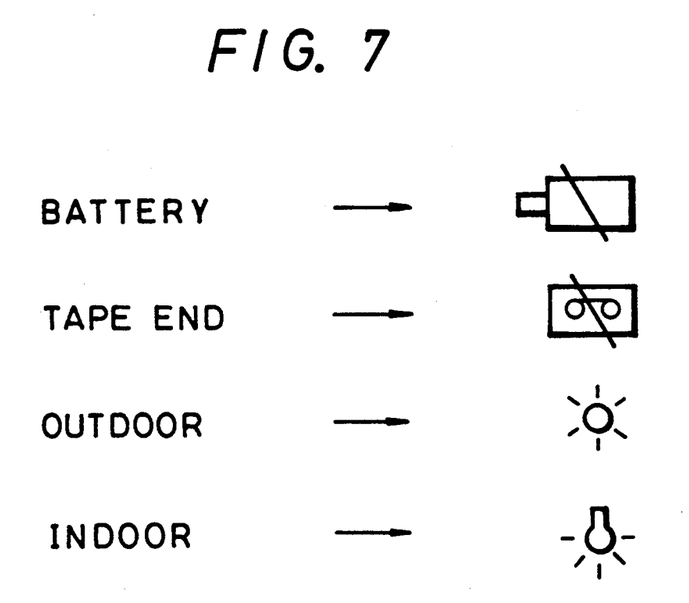
FIG. 7 is a schematic view to which reference will be made in explaining the display made within an electronic viewfinder of the present invention.

FIG. 7 shows an example of various symbol marks for indicating camera data, cautions, etc. As shown in FIG. 7, it is preferable that the above-mentioned camera data, cautions and others are indicated in the form of symbol marks instead of the English language because such symbol marks are easier to understand. To this end, character patterns corresponding to camera data, cautions and others are previously prepared in a character generator formed of a read only memory (ROM) or a random access memory (RAM)

Figure 8A:
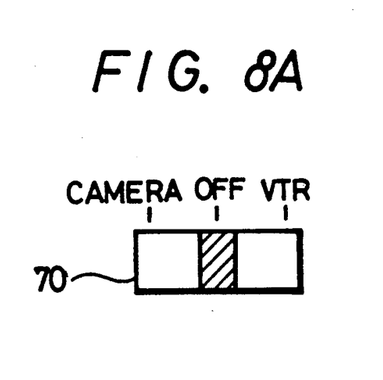
FIGS. 8A and 8B are schematic views to which reference will be made in explaining the power switch of the present invention.

A power switch 70 shown in FIG. 8A is provided at a predetermined position of the apparatus body 30 (see FIG. 2). The power switch 70 can be formed of a three-slide position contact switch which is freely slidable among the camera position contact (CAMERA) the OFF-position contact (OFF) and the video tape recorder position contact (VTR). Thus, the respective position contacts provide the camera mode, the VTR mode and the OFF-mode. The OFF-mode makes only the EJECT key effective, the VTR mode makes only the VTR-system keys such as the playback key, the fast-forward key, the rewind key, the pause key and the recording key effective and the camera mode makes only the camera-system keys such as the start/stop key or the like effective. Thus, only the key necessary for each mode becomes effective so that the apparatus of the present invention becomes easier for the user to handle.

If the user wants to find out the starting portion of the recorded event by placing the video tape recorder in the fast forward mode (FF mode) or the rewind mode (REW mode) or if the user wants to confirm the reproduced picture while the camera is set in the recording mode, there is then presented a problem that the user has to switch the camera mode into the VTR mode.

Figure 8B:
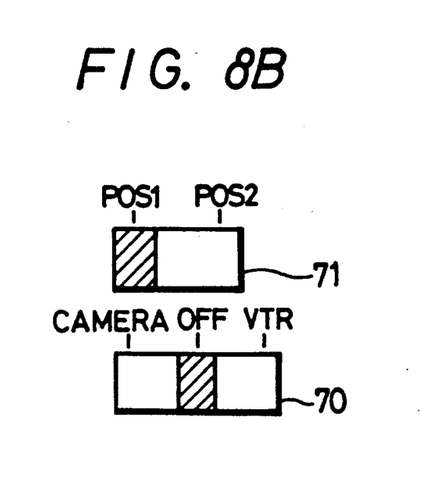

In order to solve the above-mentioned problem, this embodiment, as shown in FIG. 8B, includes a two-slide position contact switch 71 in addition to the power switch 70. This two-slide position contact switch 71 has a first position contact POS1 and a second position contact POS2. If the power switch 70 is connected to the camera mode contact and the switch 71 is connected to the first position contact POS1, then the apparatus is set in the camera mode.

If the power switch 70 is connected to the camera mode contact and the switch 71 is connected to the second position contact POS2, then the apparatus is set in the camera and video tape recorder mode. Thus, except in the camera mode, all of the keys for the VTR system and for the camera system can be made effective, which provides an apparatus easy to handle.

Consequently, without degrading the operating characteristic according to the prior art, an extended function of camera and VTR mode can be presented, and hence, the apparatus of the present invention can meet with requirements of those who want a simple operating characteristic and an operating characteristic useful for practice.

As described above, according to the present invention, the third operation switch can be selectively used in response to the operation of the second operation switch, wherein when the second operation switch is in its ON-state, the third operation switch functions an inherent color selecting switch, while when the second operation switch is in its OFF-state, the third operation switch functions as the selecting switch which selects such other functions as scroll mode, reverse mode, reverse/scroll mode and the like. Thus, without adding a special operation switch, many additional functions can be realized by the single operation switch, which provides a simplified arrangement, a reduced cost and an improved operating characteristic.

Having described a preferred embodiment of the invention with reference to the accompanying drawings, it is to be understood that the invention is not limited to that precise embodiment, and that various changes and modifications may be effected by one skilled in the art without departing from the scope or spirit of the invention as defined in the appended claims.

We claim as our invention:

1. A video recording apparatus of the type having a built-in type camera which includes an image pickup portion for picking an object and a recording portion for recording a video signal derived from the image pickup portion in accordance with a predetermined format, wherein the improved apparatus comprises:

(a) means for converting the video signal from the image pickup portion to digital image data;

(b) memory means for storing the digital image data;

(c) means for producing an image signal from the image data read out from the memory means, said image signal having a plurality of modes;

(d) means for superimposing the image signal formed of the image data upon the video signal from the image pickup portion;

(e) control means for controlling the writing and reading of the image data in the memory means;

(f) first operation switch means for triggering the control means to store the image data in the memory means;

(g) second operation switch means for triggering the control means to superimpose the image signal upon the video signal; and (h) third operation switch means for triggering the control means to designate a color for the image signal, wherein when the second operation switch means has not been engaged, the third operation switch means is operated as a mode selection switch for selecting one of the modes of the image signal.

2. The apparatus according to claim 1, in which the third operation switch means when operating as a mode selection switch is capable of selecting one of a scroll mode, a reverse mode or a reverse/scroll mode.

3. The apparatus according to claim 1, in which the predetermined format is an 8 mm video format.

4. The apparatus according to claim 1, further comprising power switch means of the three-position slide type, wherein when the power switch means is connected to a first, a second or a third contact, the apparatus is driven in the camera mode, the video tape recorder mode or the OFF-mode, respectively.

5. The apparatus according to claim 4, further comprising slide switch means having two slide contact positions, wherein when the power switch means is connected to the first contact and the slide switch means is in a first slide contact position, the apparatus is driven in the camera mode, while when the power switch means is connected to the first contact and the slide switch means is in a second contact position, the apparatus is driven in the combination mode of the camera mode and the video tape recorder mode.

* * * * *